United States Patent [19]
Boehme et al.

[11] Patent Number: 5,965,956
[45] Date of Patent: Oct. 12, 1999

[54] OVERHEAD LINE FOR ELECTRIC ENERGY TRANSMISSION

[75] Inventors: Helmut Boehme, Nussloch; Gerd Fitterer, Mannheim; Rolf Paschen, Bad Schoenborn; Bernd Smailus, Hemsbach, all of Germany

[73] Assignee: ABB Research Ltd., Zuerich, Switzerland

[21] Appl. No.: 08/960,763

[22] Filed: Oct. 30, 1997

[30] Foreign Application Priority Data

Oct. 30, 1996 [DE] Germany ............................ 196 45 001

[51] Int. Cl.$^6$ ................................................ H04B 3/30
[52] U.S. Cl. ................................ 307/91; 307/89; 174/32; 333/12
[58] Field of Search .................... 307/89, 90, 91, 307/104, 105, 147, 100, 108, 109; 333/12; 336/84; 174/32–34, 36, 40 R, 43, 35 R, 35 MS; 361/107, 143, 146, 139

[56] References Cited

U.S. PATENT DOCUMENTS

| | | | |
|---|---|---|---|
| 1,938,732 | 12/1933 | Vaage | 307/91 |
| 2,075,965 | 4/1937 | Traves | 307/91 |
| 2,214,134 | 9/1940 | Herz | 307/89 |
| 2,466,626 | 4/1949 | Weaver | 307/89 |
| 3,292,016 | 12/1966 | Kafka | 307/89 |
| 3,801,877 | 4/1974 | Griese et al. | 361/139 |
| 4,352,026 | 9/1982 | Owen | 307/14 |
| 5,068,543 | 11/1991 | Ohkawa | 174/32 |
| 5,175,442 | 12/1992 | Ashley | 174/45 R |
| 5,218,507 | 6/1993 | Ashley | 174/36 |
| 5,360,998 | 11/1994 | Walling | 307/91 |
| 5,365,115 | 11/1994 | Kalyon et al. | 307/91 |
| 5,391,929 | 2/1995 | Kalyon et al. | 174/36 |
| 5,465,012 | 11/1995 | Dunnam | 307/91 |
| 5,536,978 | 7/1996 | Cooper et al. | 333/12 |
| 5,616,969 | 4/1997 | Morava | 174/35 R |
| 5,619,079 | 4/1997 | Wiggins et al. | 307/105 |
| 5,656,872 | 8/1997 | Lee | 174/32 |
| 5,736,839 | 4/1998 | Pettersson | 323/213 |
| 5,767,667 | 6/1998 | Shafie | 324/127 |
| 5,777,401 | 7/1998 | Sjodin | 307/104 |

*Primary Examiner*—Richard T. Elms
*Assistant Examiner*—Peter Ganjian
*Attorney, Agent, or Firm*—Herbert L. Lerner; Laurence A. Greenberg

[57] ABSTRACT

An overhead line for electrical energy transmission includes at least one phase conductor which receives a phase current which has a phase and an amplitude. A compensation loop surrounds the at least one phase conductor. A compensation current which has a phase and an amplitude is fed into the compensation loop by a driving voltage. The phase and the amplitude of the compensation current is set with respect to the phase and the amplitude of the phase current flowing in the at least one phase conductor such that a magnetic flux produced by the compensation current counteracts a magnetic flux produced by the phase current. At least one additional loop surrounds the at least one phase conductor connected to the compensation loop. The driving voltage for the compensation current is produced in the compensation loop and in the at least one additional loop. The compensation loop and the at least one additional loop define the at least one phase conductor into at least two main sections. The compensation loop defines a first main section of the at least two main sections and the at least one additional loop defines at least one second section of the at least two main sections.

13 Claims, 6 Drawing Sheets

X: DISTANCE TO THE OVERHEAD LINE AXIS(m) ⟶

OVERHEAD LINE FOR ELECTRIC ENERGY TRANSMISSION

BACKGROUND OF THE INVENTION

FIELD OF THE INVENTION

The invention relates to an overhead line for electrical energy transmission, more specifically, to an overhead line having an additional loop which surrounds at least one phase conductor of the overhead line.

Depending on the current transmitted, a magnetic field is unavoidably produced in the vicinity of the overhead lines. The magnetic field is characterized, inter alia, by the root mean square (rms) value of its magnetic induction.

In order to avoid hazardous interactions between the magnetic field and human health, it should be as low as possible at points which are intended for occupancy by people, and must in no case exceed recommended limits or legally defined limits.

SUMMARY OF THE INVENTION

It is accordingly an object of the invention to provide an overhead line for electrical energy transmission, which overcomes the herein-mentioned disadvantages of the heretofore-known devices and methods of this general type, and which produces a considerably reduced magnetic field in the region underneath the conductors and in the vicinity of the surface of the earth and preferably up to a height of 2 to 3 m above the surface.

With the foregoing and other objects in view there is provided, in accordance with the invention, an overhead line for electrical energy transmission, comprising at least one phase conductor which conducts a phase current having a phase and an amplitude and producing a given magnetic flux; a compensation loop surrounds the at least one phase conductor, the compensation loop carrying a compensation current which has a phase and an amplitude and is fed into the compensation loop by a driving voltage, the phase and the amplitude of the compensation current are set with respect to the phase and the amplitude of the phase current flowing in the at least one phase conductor such that a magnetic flux produced by the compensation current counteracts the given magnetic flux produced by the phase current; at least one additional loop surrounds the at least one phase conductor and is connected to the compensation loop, the driving voltage for the compensation current is produced in the compensation loop and in the at least one additional loop; and the compensation loop and the at least one additional loop dividing the overhead line into at least two main segments, the compensation loop defines a first main segment and the at least one additional loop defines at least one second segment of the at least two main segments.

In this case, the first conductors of the compensation loop and the additional loop correspond to the upper conductors in a vertical phase conductor arrangement and to the left conductors in a horizontal phase conductor arrangement. The second conductors of the compensation loop and additional loop correspond to the lower conductors in a vertical phase conductor arrangement and to the right conductors in a horizontal phase conductor arrangement.

The advantages which can be achieved by the invention are, in particular, that both the maximum rms value of the magnetic induction $B_{rmsmax}$ in a region up to a height of 2 to 3 m above the surface of the earth and a distance $x_{0.2\ \mu T}$ from an overhead line axis at which the rms value of the magnetic induction reaches the value 0.2 $\mu$T at a height of 2 m above the surface of the earth and is less at greater distances, are significantly reduced. The magnetic field(s) in the region 2 to 3 m above the surface of the earth can be reduced to less than 10% in comparison with those from an uncompensated, conventional overhead line. This is because the magnetic coupling between the compensation loop (in particular the phase and amplitude of the compensation current) and the overhead line is mutually matched. That is to say that the compensation loop, the additional loop and the overhead line are regarded as a geometric and electrical unit.

Since the conductors of the compensation loop are virtually at earth potential (one point of the compensation loop is grounded to the earth), the upper conductor of an overhead line having conductors disposed directly one above the other advantageously also acts like an earthing cable for lightning protection. The lower earthed conductor also advantageously acts as a screen for the electrical field.

In accordance with an added feature of the invention, there is a series capacitor connected in the at least one additional loop.

In accordance with another feature of the invention, the at least one phase conductor is a three-phase system which has three phase conductors, the three phase conductors have an upper phase conductor and a lower phase conductor and the three phase conductors are disposed directly one above the other, the compensation loop has a first conductor and a second conductor, the first conductor of the compensation loop is disposed above the upper phase conductor, and the second conductor of the compensation loop is disposed below the lower phase conductor.

In accordance with an additional feature of the invention, the at least one phase conductor is a three-phase system which has three phase conductors, the three phase conductors have a first outer phase conductor and a second outer phase conductor and the three phase conductors are disposed alongside one another, the compensation loop has a first conductor and a second conductor, the first conductor of the compensation loop is disposed alongside the first outer phase conductor, and the second conductor of the compensation loop is disposed alongside the second outer phase conductor.

In accordance with yet another added feature of the invention, the at least one additional loop has a first conductor and a second conductor, the at least one additional loop surrounds only one phase conductor of the at least one phase conductor, the compensation loop has a first conductor and a second conductor, the first conductor of the at least one additional loop is connected to the first conductor of the compensation loop, and the second conductor of the at least one additional loop is connected to the second conductor of the compensation loop.

In accordance with yet another feature of the invention, the at least one additional loop has a first conductor and a second conductor, the at least one additional loop surrounds only one phase conductor of the at least one phase conductor, the compensation loop has a first conductor and a second conductor, the first conductor of the at least one additional loop is connected to the second conductor of the compensation loop, and the second conductor of the at least one additional loop is connected to the first conductor of the compensation loop.

In accordance with an yet another additional feature of the invention, the at least one additional loop has a first conductor and a second conductor, the at least one phase conductor is one of at least two phase conductors and the at least one additional loop surrounds two phase conductors of the at least two phase conductors, the compensation loop has a first conductor and a second conductor, the first conductor of the at least one additional loop is connected to the first conductor of the compensation loop, and the second conductor of the at least one additional loop is connected to the second conductor of the compensation loop.

In accordance with an added feature of the invention, the at least one additional loop has a first conductor and a second conductor, the at least one phase conductor is one of at least two phase conductors and the at least one additional loop surrounds two phase conductors of the at least two phase conductors, the compensation loop has a first conductor and a second conductor, the first conductor of the at least one additional loop is connected to the second conductor of the compensation loop, and the second conductor of the at least one additional loop is connected to the first conductor of the compensation loop.

In accordance with another feature of the invention, the at least one additional loop has a first conductor and a second conductor, the at least one phase conductor is one of three phase conductors and the at least one additional loop surrounds the three phase conductors, the compensation loop has a first conductor and a second conductor, the first conductor of the at least one additional loop is connected to the second conductor of the compensation loop, and the second conductor of the at least one additional loop is connected to the first conductor of the compensation loop.

In accordance with an additional feature of the invention, the compensation loop has a first side and a second side, the at least one additional loop is two additional loops formed of a first additional loop and a second addition loop, the first additional loop is disposed on the first side of the compensation loop and the second additional loop is disposed on the second side of the compensation loop.

In accordance with yet another added feature of the invention, the at least one phase conductor is one of a plurality of phase conductors, the two additional loops each surround a different phase conductor of the plurality of phase conductors, the first additional loop, the second additional loop and the compensation loop each have a first conductor and a second conductor, the first conductor of the first additional loop is connected to the first conductor of the compensation loop, the second conductor of the first additional loop is connected to the second conductor of the compensation loop, the first conductor of the second additional loop is connected to the second conductor of the compensation loop, and the second conductor of the second additional loop is connected to the first conductor of the compensation loop.

In accordance with yet another feature of the invention, the at least one phase conductor is one of a plurality of phase conductors, the two additional loops each surround a different phase conductor of the plurality of phase conductors, the first additional loop, the second additional loop and the compensation loop each have a first conductor and a second conductor, the first conductor of the first additional loop is connected to the second conductor of the compensation loop, the second conductor of the first additional loop is connected to the first conductor of the compensation loop, the first conductor of the second additional loop is connected to the first conductor of the compensation loop, and the second conductor of the second additional loop is connected to the second conductor of the compensation loop.

In accordance with a concomitant feature of the invention, the at least one phase conductor is one of a plurality of phase conductors, the two additional loops each surround two phase conductors of the plurality of phase conductors, the first additional loop, the second additional loop and the compensation loop each have a first conductor and a second conductor, the first conductor of the first additional loop is connected to the first conductor of the compensation loop, the second conductor of the first additional loop is connected to the second conductor of the compensation loop, the first conductor of the second additional loop is connected to the second conductor of the compensation loop, and the second conductor of the second additional loop is connected to the first conductor of the compensation loop.

DESCRIPTION OF THE PREFERRED EMBODIMENTS

Figure 1:
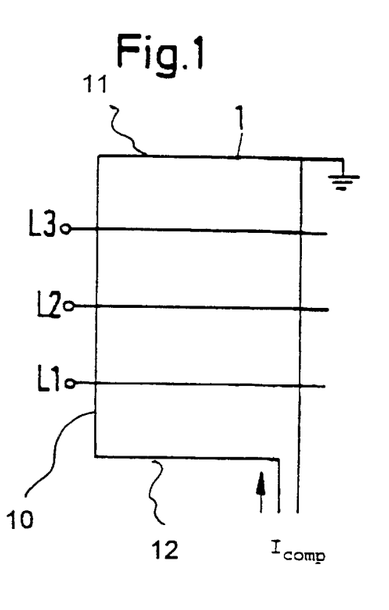
FIG. 1 is a diagrammatic, side-elevational view of a basic arrangement of an overhead line with a reduced magnetic field according to the invention.

Referring now to the figures of the drawings in detail and first, particularly, to FIG. 1 thereof, there is shown a basic arrangement of an overhead line with a reduced magnetic field. Three phase conductors L1, L2, L3 of a three-phase system are disposed one above the other (with three currents each phase-shifted through 120°, the phase angles being $\phi(iR)=0°$, $\phi(iS)=-120°$ and $\phi(iT)=-240°$). The three phase conductors L1, L2, L3 are surrounded by a compensation loop 1. An upper conductor 11 (also called a first conductor) of the compensation loop 1 runs above an upper phase conductor L3, and a lower conductor 12 (also called a second conductor) of the compensation loop 1 runs below the lower phase conductor L1. The upper 11 and lower 12 conductors, or first and second conductors, of the compensation loop 1 are connected to one another via side, vertical connecting conductors 10.

Figure 2:
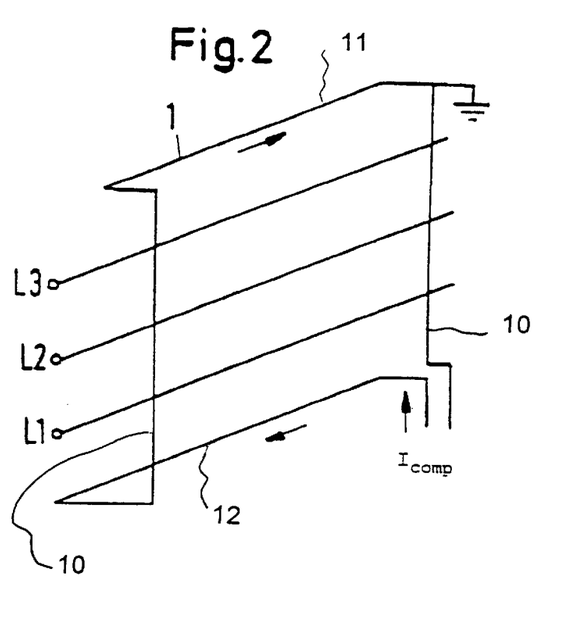
FIG. 2 is a diagrammatic, perspective view of the basic arrangement.

FIG. 2 shows a perspective view of the basic arrangement. It can be seen in particular that the upper 11 conductor of the compensation loop 1, the three phase conductors L1, L2, L3 and the lower conductor 12 of the compensation loop 1 are disposed directly one above the other, while the vertical connecting conductors 10 run at their sides.

In order to reduce the magnetic field occurring in a region of the surface of the earth underneath the overhead line, a compensation current $I_{comp}$ is fed into the compensation loop 1. A magnetic field produced by the compensation current is superimposed in a compensating manner on a magnetic field produced by the phase conductors such that the magnetic field between the surface of the earth and a height of 2 to 3 m is significantly reduced. A required phase of the compensation current $I_{comp}$ depends on which of the possible phase sequences is actually used. In principle, in the case of the three-phase system, six different phase sequences can be used, namely L1=R, L2=S, L3 =T (called RST for short), L1=R, L2=T, L3=S (called RTS for short), L1=T, L2=R, L3=S (called TRS for short), L1=T, L2=S, L3=R (called TSR for short), L1=S, L2=T, L3=R (called STR for short), or L1=S, L2=R, L3=T (called SRT for short).

Figure 8:
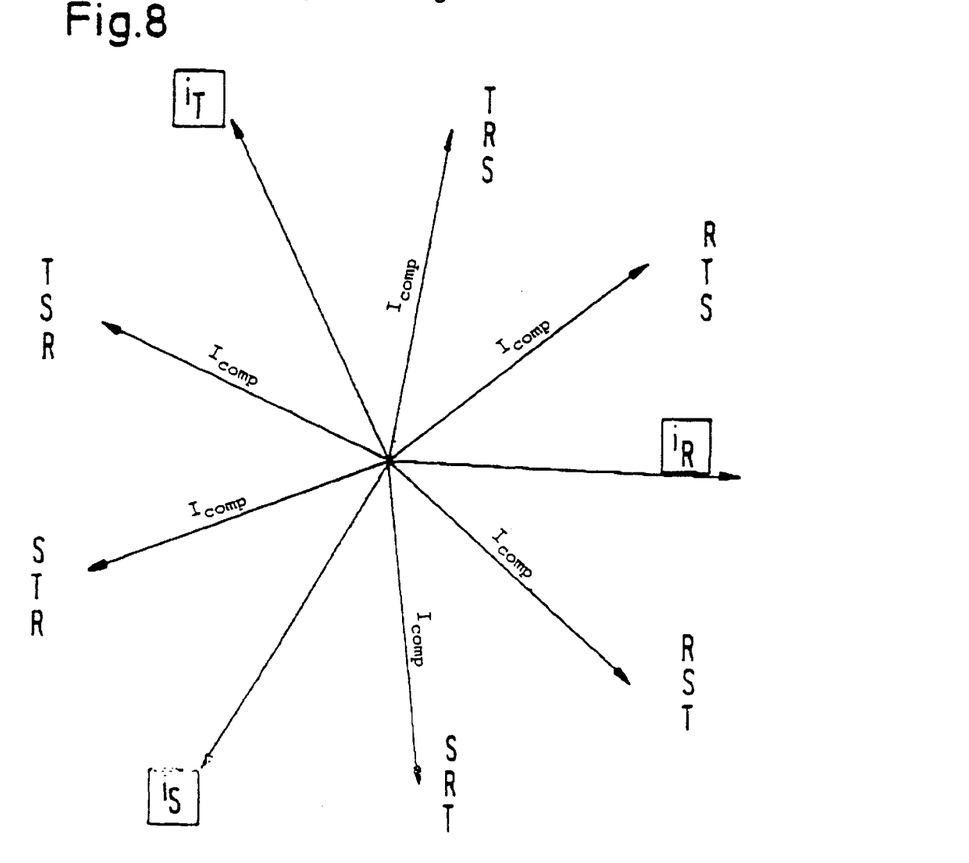
FIG. 8 is a diagrammatic view of the basic phases of compensation currents in a lower conductor of the compensation loop for a possible conductor current phase sequences.

To illustrate the phases, FIG. 8 shows a basic required position of vectors of the compensation currents $I_{comp}$ for maximum reduction of the magnetic field for the possible phase sequences denoted above. Positions of the vectors of the phase currents iR, iS, iT are marked. As can be seen, the phases of the compensation currents $I_{comp}$ required for optimum magnetic field reduction are approximately in antiphase to the respective bottom phase, that is to say the phase closest to the surface of the earth. Those required phases of the compensation currents $I_{comp}$ as well as a required amplitudes can be calculated taking into account resistances and reactances of a current path and an actual arrangement (geometry) of the phase conductors and of the compensation loop 1, as well as the amplitudes of the phase currents iR, iS, iT.

If the phase and the amplitude of the compensation current $I_{comp}$ fed into the compensation loop 1 are correct, the result is a major reduction in the rms value of the induction, such that, as desired, $B_{rmsmax}$ and $x_{0.2 \ \mu T}$ are significantly reduced. For example, the current level of the compensation current is approximately 40% of the phase current.

In the case of the basic arrangement according to FIGS. 1 and 2, it is a complicating factor that the compensation current $I_{comp}$ must be actively fed into the compensation loop 1 from an external voltage source. FIGS. 3–7 as well as 12 to 16 show variants of the basic arrangement with compensation loops 1 and additional loops 2,5. The variants do not have the disadvantage of actively fed compensation current $I_{comp}$ and are passive in terms of the production of the driving voltage required for the compensation current $I_{comp}$. In all of the variants, the driving voltage required to produce the compensation current $I_{comp}$ is produced by the three-phase system itself.

To this end, the overhead line is split horizontally into at least two main sections, including a first main section with the compensation loop 1 and a second main section with an additional loop 2 which is connected to the compensation loop 1. In the first main section, the compensation loop 1 advantageously reduces $B_{rmsmax}$ and $x_{0.2 \ \mu T}$, while those variables which characterize the magnetic field are slightly increased in the second main section because of the additional loop 2. This must be noted in the configuration of the overhead line and, in particular, with regard to the selection of the length and position of the compensation loop 1 and additional loop 2. It is also possible to split the overhead line into 3, 4 or more sections with a plurality of additional loops 2,5 and/or a plurality of compensation loops 1. The important factor in this case is to know the sections in which an extreme reduction in the magnetic field is required, and the sections in which this is unnecessary.

A series capacitor 4 disposed in the additional loop 2 compensates for an inductive voltage drop in the additional loop 2 and produces a desirable phase shift of the compensation current $I_{comp}$ to the required phase. The amplitude of a no-load voltage $U_{add}$ induced in the additional loop 2 is a function of the length of the additional loop 2.

Figure 3:
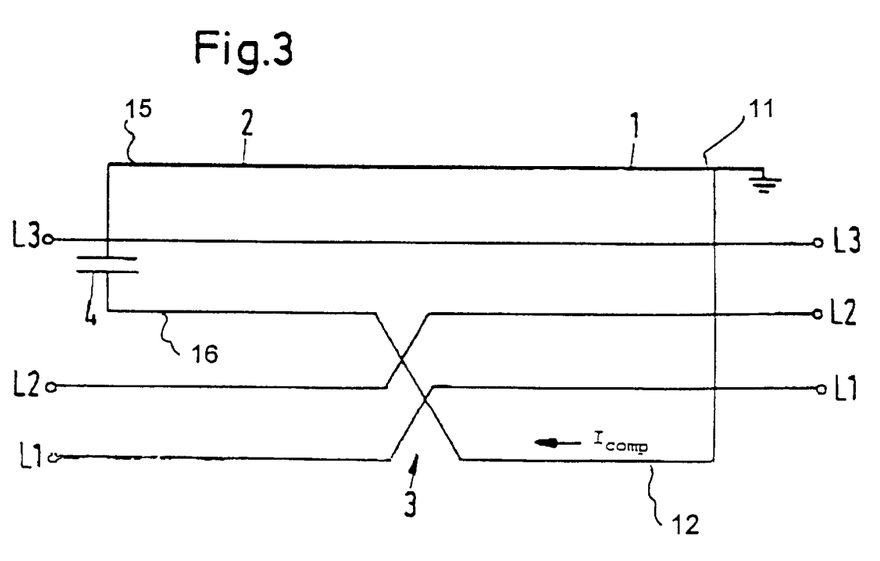
FIGS. 3–7 are diagrammatic, side-elevational views of variations of the basic arrangement with a compensation loop and an additional loop.

In the case of the variant according to FIG. 3, the additional loop 2 surrounds only the upper phase conductor L3. The result is a crossing 3, at which the connection between a lower conductor 16 of the additional loop 2 (also called a second conductor 16 of the additional loop 2) and the lower conductor 12 of the compensation loop 1 crosses the two lower phase conductors L1, L2. In the second main section of the additional loop 2, a vertical arrangement of the conductor system is obtained, from top to bottom, as follows: upper conductor 15 of the additional loop 2, L3, lower conductor 16 of the additional loop 2, L2, and then L1. In the first main section of the compensation loop 1, the vertical arrangement (which is already known from the basic arrangement) is obtained with the arrangement: upper conductor 11 of the compensation loop 1, L3, L2, L1, and then the lower conductor 12 of the compensation loop 1.

Figure 4:
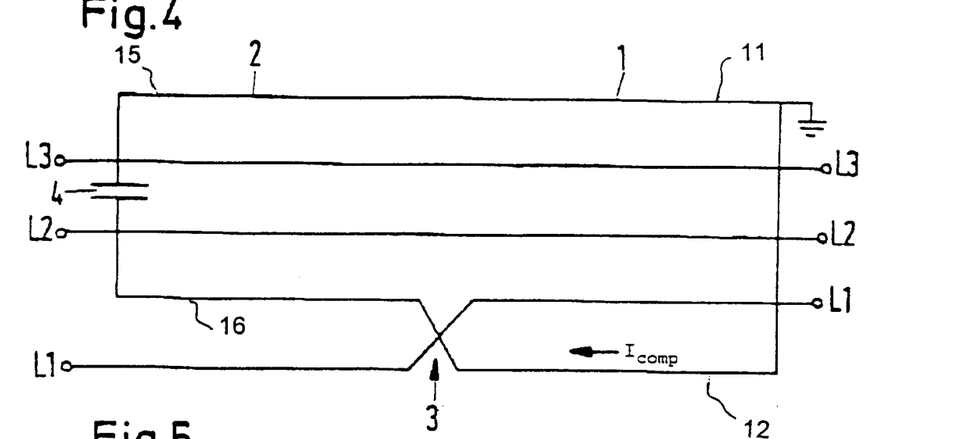

In a variant according to FIG. 4, the additional loop 2 surrounds the two upper phase conductors L2, L3. The result is a crossing 3 at which a connection between the lower conductor 16 of the additional loop 2 and the lower conductor 12 of the compensation loop 1 crosses the lower phase conductor L1. In the second main section (additional loop), a vertical arrangement is obtained, from top to bottom, as follows: upper conductor 15 of the additional loop 2, L3, L2, lower conductor 16 of the additional loop 2, and then L1. In the first main section (compensation loop), the vertical arrangement (which is already known from the basic arrangement) is obtained with the following arrangement: the upper conductor 11 of the compensation loop 1, L3, L2, L1, and then the lower conductor 12 of the compensation loop 1.

The connection of the compensation loop 1 and the additional loop 2 according to FIGS. 3 and 4 results in the voltages induced in the two loops are added.

Figure 5:
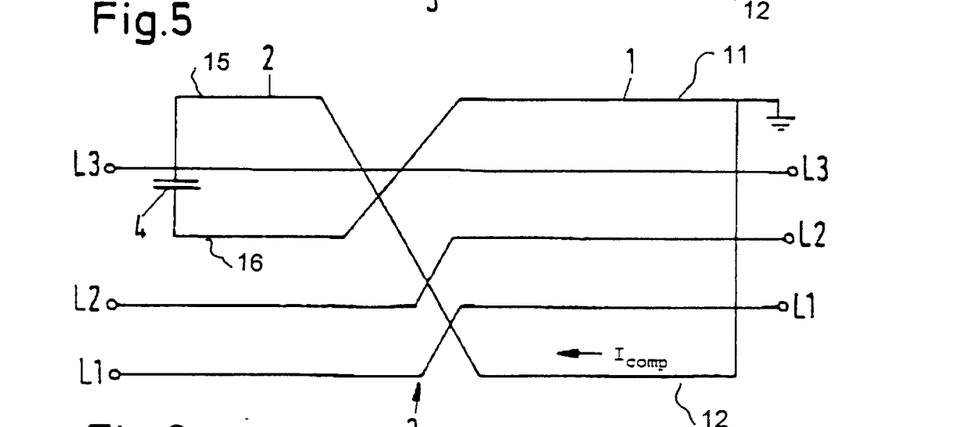

In the case of a variant according to FIG. 5, the additional loop 2 surrounds only the upper phase conductor L3. The result is a crossing 3, at which the connections between the lower conductor 16 of the additional loop 2 and the upper conductor 11 of the compensation loop 1 crosses the upper phase conductor L3. In the same way, the connection of the upper conductor 15 of the additional loop 2 (also called the first conductor 15 of the additional loop 2) to the lower conductor 12 of the compensation loop 1 crosses the two lower phase conductors L1, L2. In the second main section, a vertical arrangement is obtained, from top to bottom, as follows: upper conductor 15 of the additional loop 2, L3, lower conductor 16 of the additional loop 2, L2, and then L1. In the first main section, the vertical arrangement (which is already known from the basic arrangement) is obtained with the following order of components: the upper conductor 11 of the compensation loop 1, L3, L2, L1 and then the lower conductor 12 of the compensation loop 1.

Figure 6:
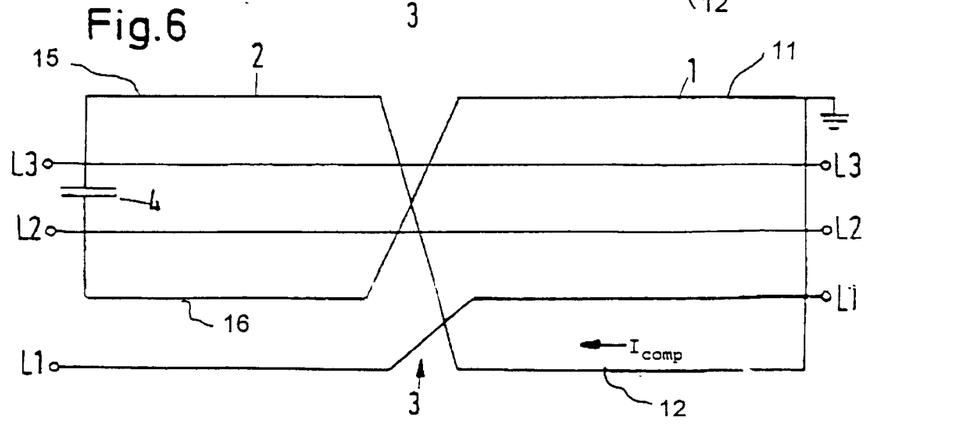

In a variant according to FIG. 6, the additional loop 2 surrounds the two upper phase conductors L2, L3. The result is a crossing 3, at which the connections between the lower conductor 16 of the additional loop 2 and the upper conductor 11 of the compensation loop 1 crosses the two upper phase conductors L2, L3. In the same way, the connection of the upper conductor 15 of the additional loop 2 to the lower conductor 12 of the compensation loop 1 crosses all three phase conductors L1, L2, L3. In the second main section (additional loop), a vertical arrangement is obtained, from top to bottom, as follows: upper conductor 15 of the additional loop 2, L3, L2, lower conductor 16 of the additional loop 2 and then L1. In the first main section (compensation loop), the vertical arrangement (which is already known from the basic arrangement) is obtained with the following ordering of components: the upper conductor 11 of the compensation loop 1, L3, L2, L1 and then the lower conductor 12 of the compensation loop 1.

Figure 7:
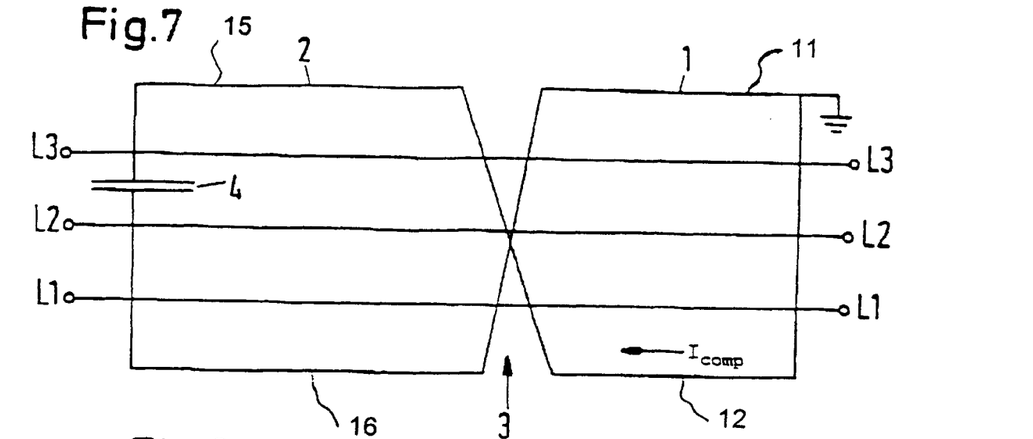

In a variant according to FIG. 7, the additional loop 2 surrounds all three phase conductors L1, L2, L3. The result is a crossing 3, at which the connections between the lower conductor 16 of the additional loop 2 and the upper conductor 11 of the compensation loop 1 crosses all three phase conductors L1, L2, L3. In the same way, the connection of the upper conductor 15 of the additional loop 2 to the lower conductor 12 of the compensation loop 1 crosses all three phase conductors L1, L2, L3. In the second main section, a vertical arrangement is obtained, from top to bottom, as follows: upper conductor 15 of the additional loop 2, L3, L2, L1, and then the lower conductor 16 of the additional loop 2.

In the first main section [compensation loop 1], the vertical arrangement which is already known from the basic arrangement is obtained with the following ordering of the components: the upper conductor 11 of the compensation loop 1, L3, L2, L1, and then the lower conductor 12 of the compensation loop 1. The connection of the compensation loop 1 and additional loop 2 according to FIGS. 5 and 7 results in the voltages induced in the two loops being subtracted.

The basic positions of the compensation currents for the possible phase sequences, which are illustrated in FIG. 8 and have already been dealt with above for the basic arrangement, apply equally to the variants according to FIGS. 3–7.

For optimum reduction of the magnetic field, the phase angle $\phi$ between the required compensation current $I_{comp}$ and the induced voltage $U_s$ in an interconnected compensation and the additional loop 2 must be less than 90° in order that the required phase of the compensation current $I_{comp}$ can be set by the capacitor 4 connected in series with the either the compensation loop 1 or the additional loop 2.

The way in which this can be achieved for the individual phase sequences using the variants described above will be dealt with in the following FIGS. 9 and 10. In general, the voltage induced in the additional loop 2 is such that the superimposition of the two voltages (in the additional loop 2 and in the compensation loop 1) satisfies the phase condition quoted above.

Figure 9:
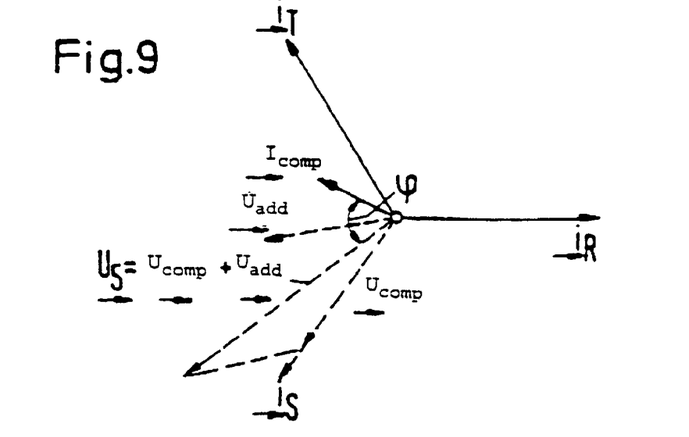
FIG. 9 is a diagrammatic view of a formation of a suitable driving voltage by an addition of a compensation voltage and additional voltage (applicable to the variants according to FIGS. 3, 4 and different phase sequences)

By way of example, FIG. 9 illustrates the formation of a suitable driving voltage (=sum voltage $U_s$) by the addition of the compensation voltage (=no-load voltage $U_{comp}$) and the additional voltage (=no-load voltage $U_{add}$). The voltage addition is required for the phase sequences L3=T, L2=S, L1=R (TSR for short) or L3=R, L2=T, L1=S (RTS for short) or L3=S, L2=R, L1=T (SRT for short), for which the phase angle f between $I_{comp}$ and $U_s$ is less than 90° (see, for example, FIG. 3 where L1=R, L2=S, L3=T). The required phase of the compensation current $I_{comp}$, the no-load voltage $U_{comp}$ induced in the compensation loop 1, the phase angle f and the no-load voltage $U_{add}$ induced in the additional loop 2 can be seen. As can be seen, a sum voltage $U_s$ is produced by the vectorial addition of the no-load voltages $U_{add}+U_{comp}$ and is shifted in the direction of the desired phase of the compensation current $I_{comp}$ such that the phase angle $\phi$ between $I_{comp}$ and $U_s$ is less than 90°. The three phase sequences quoted above can accordingly be operated with one of the variants according to FIGS. 3 or 4, in which voltage addition is produced.

Figures 10, 11:
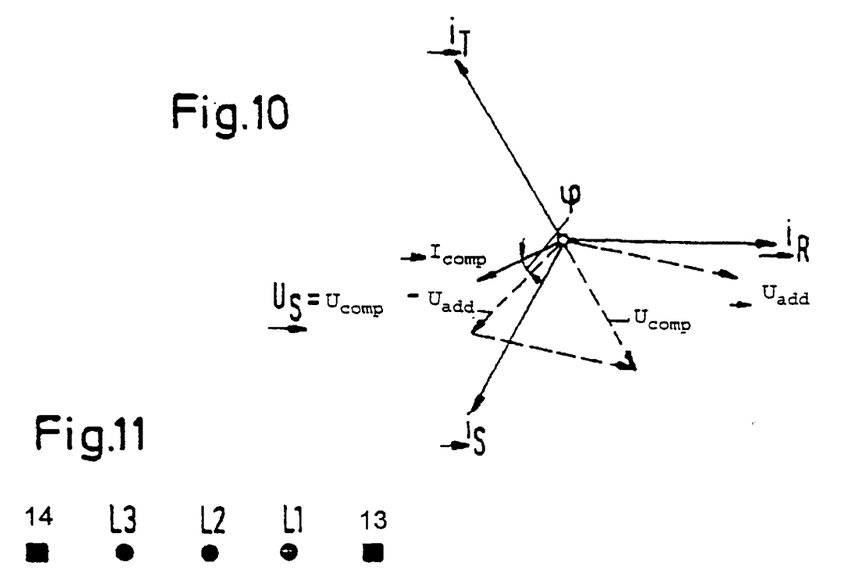
FIG. 10 is a diagrammatic view of the formation of the suitable driving voltage by subtraction of the compensation voltage and additional voltage (applicable to the variants according to FIGS. 5, 6, 7 and different phase sequences)
FIG. 11 is a diagrammatic, front elevational view of the possible position of the compensation loop for phase conductors disposed alongside one another.

By way of example, FIG. 10 shows the formation of a suitable driving voltage (=sum voltage $U_s$) by subtraction of the compensation voltage (=no-load voltage $U_{comp}$) and the additional voltage (=no-load voltage $U_{add}$). The voltage subtraction is required for the phase sequences L3=S, L2=T, L1=R (STR for short) or L3=T, L2=R, L1=S (TRS for short) or L3=R, L2=S, L1=T (RST for short), in order to achieve a phase angle of f between $I_{comp}$ and $U_s$ of less than 90° (see, for example, FIG. 5 where L1=R, L2=T, L3=S). The required phase of the compensation current $I_{comp}$, the no-load voltage $U_{comp}$ induced in the compensation loop 1, the no-load voltage $U_{add}$ induced in the additional voltage, the voltage $U_s$ of the interconnected loops and the phase angle f can be seen. As can be seen, a difference voltage is produced by vectorial subtraction of $U_{comp}-U_{add}$, which is shifted in the direction of the desired phase of the compensation current $I_{comp}$. The three phase sequences quoted above can accordingly be operated with one of the variants according to FIGS. 5 to 7, in which voltage subtraction is produced by the additional crossing of the conductors of the compensation loop 1 and the additional loop 2.

In general, it can be said for all the variants dealt with above that the no-load voltage induced in the additional voltage is at a maximum when the additional loop 2 surrounds only one phase conductor, as is the case in FIGS. 3 and 5. If the additional loop 2 surrounds all three phase conductors, as in FIG. 7, the no-load voltage induced in the additional voltage is a minimum.

Once, depending on the phase sequence, the sum voltage $U_s=U_{comp}+U_{add}$ or the sum voltage $U_s=U_{comp}-U_{add}$ is determined, it is possible to determine the required length of the additional loop 2, the required capacitance of the series capacitor 4 and a suitable resistance of the additional loop 2 from the required magnitude and phase of the compensation current. The required length of the additional loop 2 and the suitable resistance give the cable strength required for the additional loop 2 and the compensation loop 1. The length of the additional loop 2 will expediently be an integer multiple of the length of the compensation loop 1, in order to produce the required conductor connections and conductor crossings on the overhead line pylons.

The above considerations relate, for example, to the exemplary embodiment having three phase conductors disposed vertically one above the other, since the greatest magnetic field reduction is achieved with this phase conductor arrangement. However, the idea of the invention can also be implemented with phase conductors disposed horizontally alongside one another. The corresponding arrangement is sketched in FIG. 11. The position of the compensation loop 1 is indicated in FIG. 11. The three phase conductors L1, L2, L3 have a first outer phase conductor L1 and a second outer phase conductor L3 and the three phase conductors L1, L2, L3 are disposed alongside one another. The compensation loop 1 has a first conductor 13 and a second conductor 14. The first conductor 13 of the compensation loop 1 is disposed alongside the first outer phase conductor L1, and the second conductor 14 of the compensation loop is disposed alongside the second outer phase conductor L3. The side views for the vertical conductor arrangements illustrated in FIGS. 3 to 7 represent the plan views for the horizontal conductor arrangements. However, as already indicated, the compensating effect is not as great with horizontally disposed phase conductors L1, L2, L3 as with phase vertically disposed conductors. This is because of the fact that, in the case of phase conductors disposed vertically one above the other, the magnetic field underneath the overhead line is polarized linearly, which assists in the compensation.

The quotation of phase sequences may be largely omitted if the phase of the phase current of the central phase conductor is introduced as a reference phase. If the phase current in an outer conductor is lagging, the additional loop 2 which surrounds the conductor is connected without any crossing (addition of the voltages). An example of this is shown in FIG. 3, where the phase current in L1 is leading, the phase current in L2 is the reference phase, and the phase current in L3 is lagging.

The additional loop 5, which surrounds the conductor with the leading phase current, must be connected crossed over to the compensation loop 1 (subtraction of the voltages). An example of this is FIG. 12 where the phase current in L1 is leading, the phase current in L2 is the reference phase, and the phase current in L3 is lagging. The additional loop 5 has a first conductor 17 and a second conductor 18.

Figure 12:
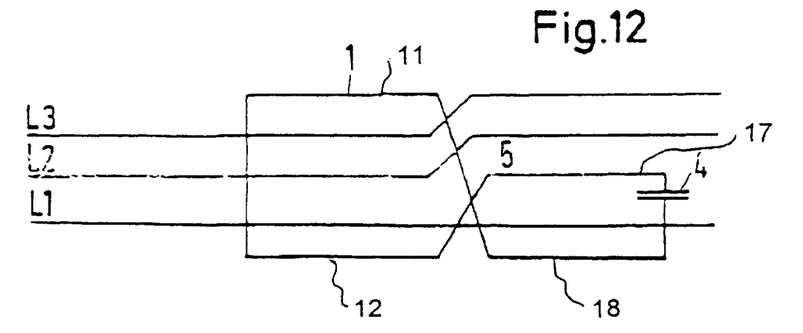
FIGS. 12–17 are diagrammatic, side-elevational views of further variations of the compensation loop and the additional loops.
Figure 13:
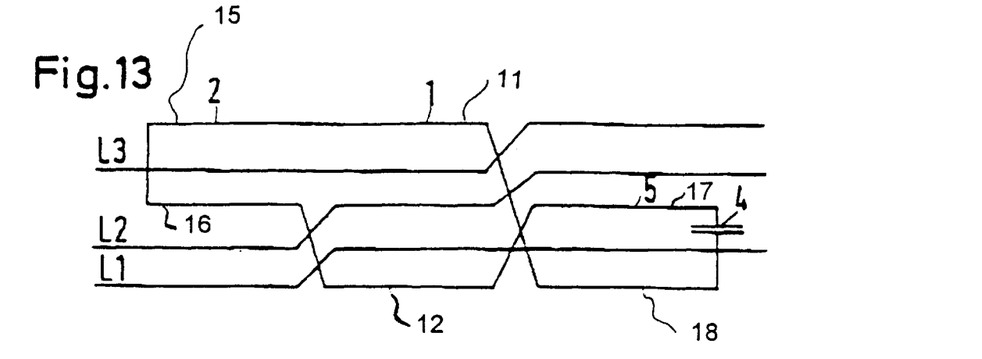

It is, of course, possible to connect both the additional loop 2 according to FIG. 3 and the additional loop 5 according to FIG. 12 jointly to the compensation loop 1, which results in the formation of the arrangement illustrated in FIG. 13 with two additional loops 2, 5 and one compensation loop 1 where the phase current in L1 is leading, the phase current in L2 is the reference phase, and the phase current in L3 is lagging.

In the case of vertical arrangements it is often important, for reasons of lightning protection, for the topmost conductor to be virtually at earth potential. This is advantageously possible for any phase sequence. The following rules may be applied to this: if the phase current in the upper conductor is lagging, then the arrangement of the additional loop 2 without crossing according to FIG. 3 must be chosen, and if the phase current in the upper conductor is leading, then the additional loop 2 must be connected to the compensation loop 1 crossed over, according to FIG. 5.

In the case of vertical conductor arrangements it may be worthwhile setting the bottom conductor virtually to earth potential in order to reduce the electrical field above the surface of the earth. This is also advantageously possible for any phase sequence. The following rules may be applied for this purpose: if the phase current in the lower conductor is leading, then the arrangement of the additional loop 5 according to FIG. 12 must be chosen. If the phase current in the lower conductor is lagging, then the additional loop 5 must be connected to the compensation loop 1 according to FIG. 14, the phase current in L1 being lagging, the phase current in L2 being the reference phase, and the phase current in L3 being leading.

Figure 14:
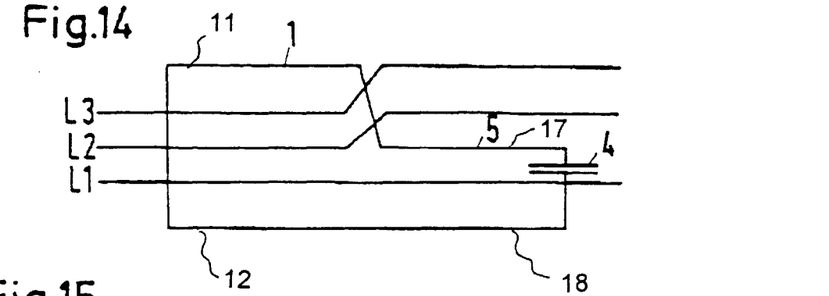
Figure 15:
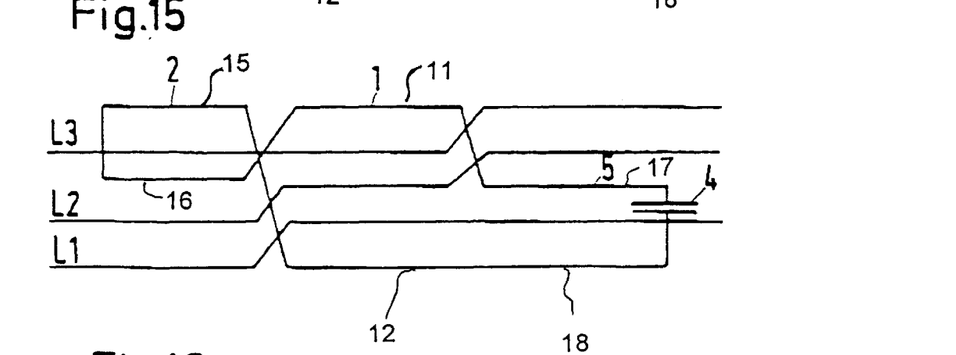

It is, of course, possible to connect both the additional loop 2 according to FIG. 5 and the additional loop 5 according to FIG. 14 to the compensation loop 1, which results in the formation of the arrangement illustrated in FIG. 15 with two additional loops 2, 5 and one compensation loop 1, where the phase current in L1 is lagging, the phase current in L2 is the reference phase, and the phase current in L3 is leading.

Figure 16:
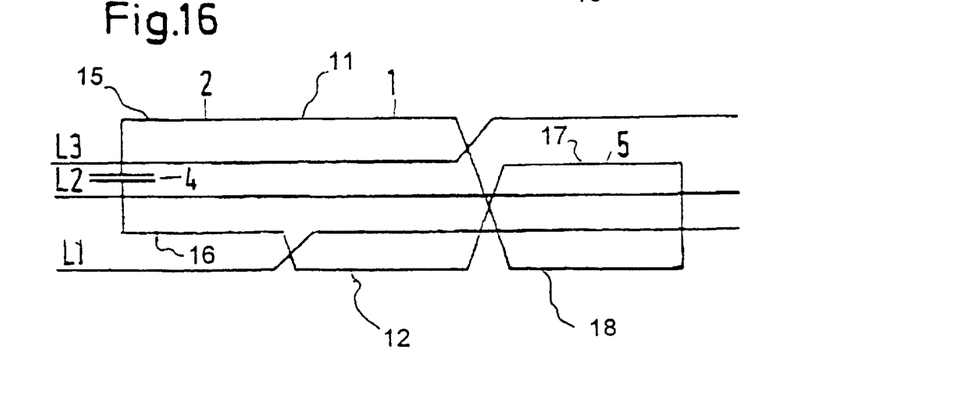

FIG. 16 shows that arrangements can also be formed having two additional loops 2, 5 connected to one compensation loop 1, in which each additional loop 2, 5 has two conductors, where the phase current in L1 is leading, the phase current in L2 is the reference phase, and the phase current in L3 is lagging. The additional loops 2, 5 have the first conductors 15, 17 and the second conductors 16, 18.

Figure 17:
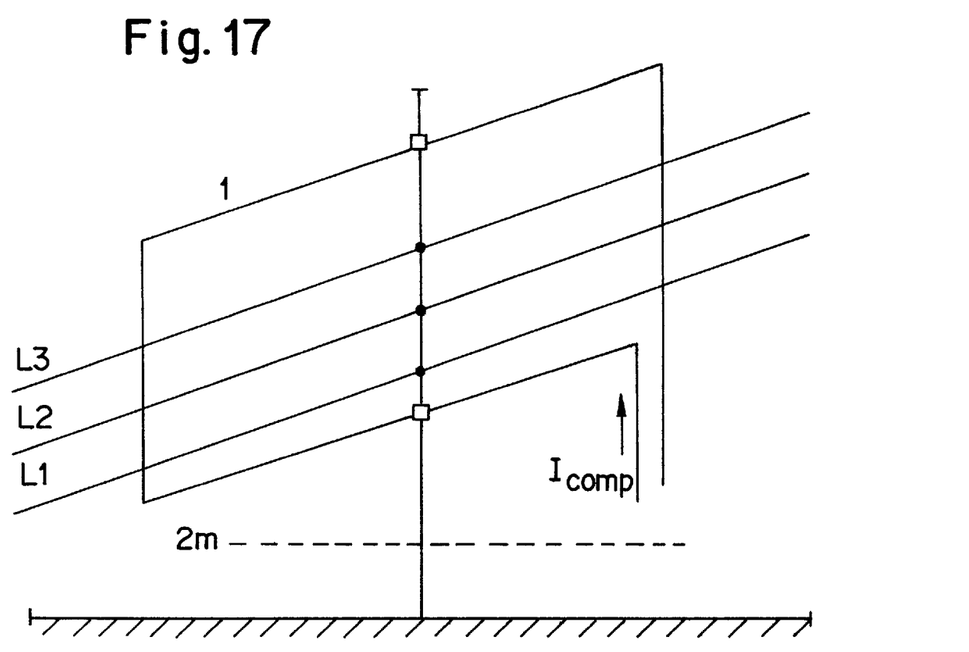
Figure 18:
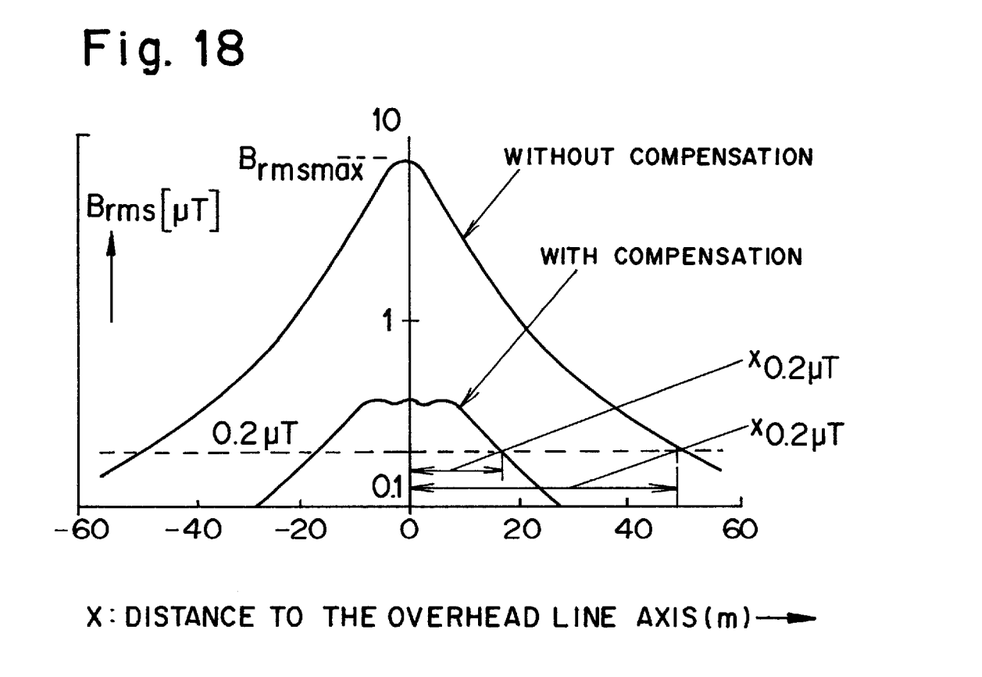
FIG. 18 is a graphic view of a magnetic induction underneath the overhead line in relation to a distance from a line axis.

By way of example, FIG. 17 shows how the magnetic induction underneath an overhead line varies with the distance from a line axis, to be precise, by way of example, for the height of 2 m above the surface of the earth (magnetic field profile with and without compensation). The line axis of the overhead line, which is vertical with respect to the surface of the earth, runs through the point x=0 m. Without compensation, the rms value of the induction $B_{rms}$ reaches its maximum $B_{rmsmax}$ of about 10 $\mu$T when x=0 m, and is reduced on both sides by x=0 m. At the distances x=+47 m and x=−47 m from the line axis, $B_{rms}$ reaches the value 0.2 $\mu$T characterizing the magnetic field, that is to say the value $x_{0.2\ \mu T}$ is 47 m. With compensation, the value $x_{0.2\ \mu T}$ is advantageously reduced to about 17 m.

Finally, the steps required for the correct configuration of the overhead line with the reduced magnetic field are summarized once again: in a first step, the amplitude and phase of the required compensation current are determined for a predetermined conductor arrangement. In a second step, the arrangement of the additional loop 2 or additional loops 2,5 is defined. In a third step, the amplitude and phase of the no-load voltage in the interconnected loops are determined. In a fourth step, the inductance of the interconnected loops is determined, if appropriate taking account of the opposing inductance for the three-phase arrangement. In a fifth step, the amplitude/phase of the no-load voltage and compensation current $I_{comp}$ as well as the inductance of the interconnected loops are used to determine the required capacitance of the series capacitor 4 and the required resistance of the interconnected loops. It may be necessary to take into account the skin effect when defining the required conductor cross-section on the basis of the resistance.

We claim:

1. An overhead line for electrical energy transmission, comprising:

at least one phase conductor conducting a phase current having a phase and an amplitude and producing a given magnetic flux;

a compensation loop surrounding said at least one phase conductor, said compensation loop carrying a compensation current having a phase and an amplitude and being fed into said compensation loop by a driving voltage, the phase and the amplitude of the compensation current being set with respect to the phase and the amplitude of the phase current flowing in said at least one phase conductor such that a magnetic flux produced by the compensation current counteracts the given magnetic flux produced by the phase current;

at least one additional loop surrounding said at least one phase conductor connected to said compensation loop, the driving voltage for the compensation current being produced in said compensation loop and in said at least one additional loop; and said compensation loop and said at least one additional loop dividing the overhead line into at least two main segments, said compensation loop defining a first main segment and said at least one additional loop defining at least one second segment of said at least two main segments.

2. The overhead line according to claim 1, including a series capacitor connected in said at least one additional loop.

3. The overhead line according to claim 1, wherein said at least one phase conductor is a three-phase system having three phase conductors, said three phase conductors having an upper phase conductor and a lower phase conductor and said three phase conductors being disposed directly one above the other, said compensation loop having a first conductor and a second conductor, said first conductor of said compensation loop being disposed above said upper phase conductor, and said second conductor of said compensation loop being disposed below said lower phase conductor.

4. The overhead line according to claim 1, wherein said at least one phase conductor is a three-phase system having three phase conductors, said three phase conductors having a first outer phase conductor and a second outer phase conductor and said three phase conductors being disposed alongside one another, said compensation loop having a first conductor and a second conductor, said first conductor of said compensation loop being disposed alongside said first outer phase conductor, and said second conductor of said compensation loop being disposed alongside said second outer phase conductor.

5. The overhead line according to claim 1, wherein said at least one additional loop has a first conductor and a second conductor, said at least one additional loop surrounding only one phase conductor of said at least one phase conductor, said compensation loop having a first conductor and a second conductor, said first conductor of said at least one additional loop being connected to said first conductor of said compensation loop, and said second conductor of said at least one additional loop being connected to said second conductor of said compensation loop.

6. The overhead line according to claim 1, wherein said at least one additional loop has a first conductor and a second conductor, said at least one additional loop surrounding only one phase conductor of said at least one phase conductor, said compensation loop having a first conductor and a second conductor, said first conductor of said at least one additional loop being connected to said second conductor of said compensation loop, and said second conductor of said at least one additional loop being connected to said first conductor of said compensation loop.

7. The overhead line according to claim 1, wherein said at least one additional loop has a first conductor and a second conductor, said at least one phase conductor being one of at least two phase conductors and said at least one additional loop surrounding two phase conductors of said at least two phase conductors, said compensation loop having a first conductor and a second conductor, said first conductor of said at least one additional loop being connected to said first conductor of said compensation loop, and said second conductor of said at least one additional loop being connected to said second conductor of said compensation loop.

8. The overhead line according to claim 1, wherein said at least one additional loop has a first conductor and a second conductor, said at least one phase conductor being one of at least two phase conductors and said at least one additional loop surrounding two phase conductors of said at least two phase conductors, said compensation loop having a first conductor and a second conductor, said first conductor of said at least one additional loop being connected to said second conductor of said compensation loop, and said second conductor of said at least one additional loop being connected to said first conductor of said compensation loop.

9. The overhead line according to claim 1, wherein said at least one additional loop has a first conductor and a second conductor, said at least one phase conductor being one of three phase conductors and said at least one additional loop surrounding said three phase conductors, said compensation loop having a first conductor and a second conductor, said first conductor of said at least one additional loop being connected to said second conductor of said compensation loop, and said second conductor of said at least one additional loop being connected to said first conductor of said compensation loop.

10. The overhead line according to claim 1, wherein said compensation loop has a first side and a second side, said at least one additional loop being two additional loops formed of a first additional loop and a second addition loop, said first additional loop being disposed on said first side of said compensation loop and said second additional loop being disposed on said second side of said compensation loop.

11. The overhead line according to claim 10, wherein said at least one phase conductor being one of a plurality of phase conductors, said two additional loops each surrounding a different phase conductor of said plurality of phase conductors, said first additional loop, said second additional loop and said compensation loop each having a first conductor and a second conductor, said first conductor of said first additional loop being connected to said first conductor of said compensation loop, said second conductor of said first additional loop being connected to said second conductor of said compensation loop, said first conductor of said second additional loop being connected to said second conductor of said compensation loop, and said second conductor of said second additional loop being connected to said first conductor of said compensation loop.

12. The overhead line according to claim 10, wherein said at least one phase conductor is one of a plurality of phase conductors, said two additional loops each surrounding a different phase conductor of said plurality of phase conductors, said first additional loop, said second additional loop and said compensation loop each having a first conductor and a second conductor, said first conductor of said first additional loop being connected to said second conductor of said compensation loop, said second conductor of said first additional loop being connected to said first conductor of said compensation loop, said first conductor of said second additional loop being connected to said first conductor of said compensation loop, and said second conductor of said second additional loop being connected to said second conductor of said compensation loop.

13. The overhead line according to claim 10, wherein said at least one phase conductor is one of a plurality of phase conductors, said two additional loops each surrounding two phase conductors of said plurality of phase conductors, said first additional loop, said second additional loop and said compensation loop each having a first conductor and a second conductor, said first conductor of said first additional loop being connected to said first conductor of said compensation loop, said second conductor of said first additional loop being connected to said second conductor of said compensation loop, said first conductor of said second additional loop being connected to said second conductor of said compensation loop, and said second conductor of said second additional loop being connected to said first conductor of said compensation loop.

* * * * *